H. J. TIFFANY & G. A. YOUNG.
AUTOMOBILE CURTAIN.
APPLICATION FILED MAR. 30, 1914.
1,140,858.
Patented May 25, 1915.
2 SHEETS—SHEET 1.
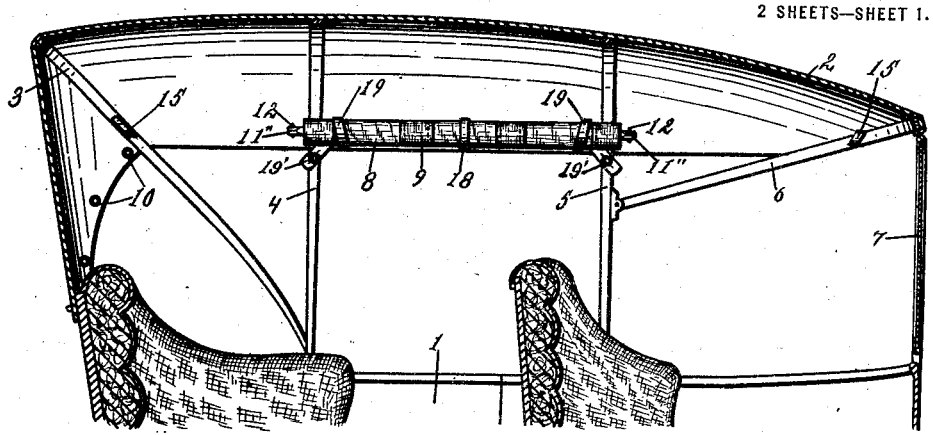
Fig. I.
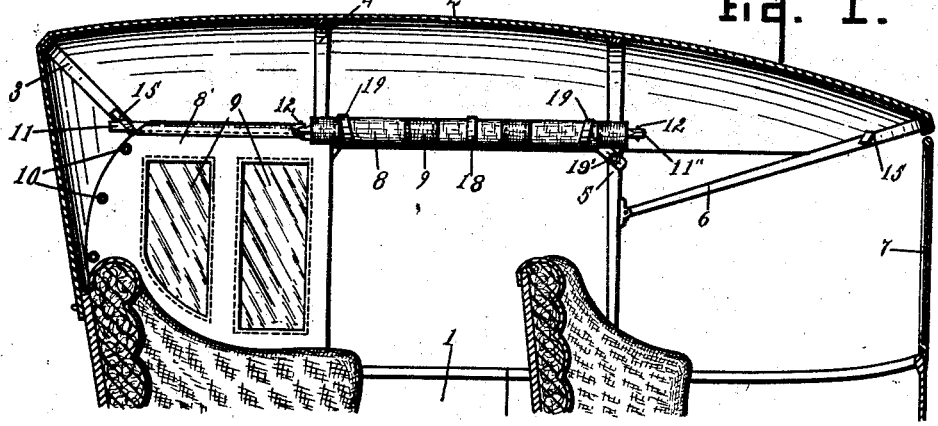
Fig. II.
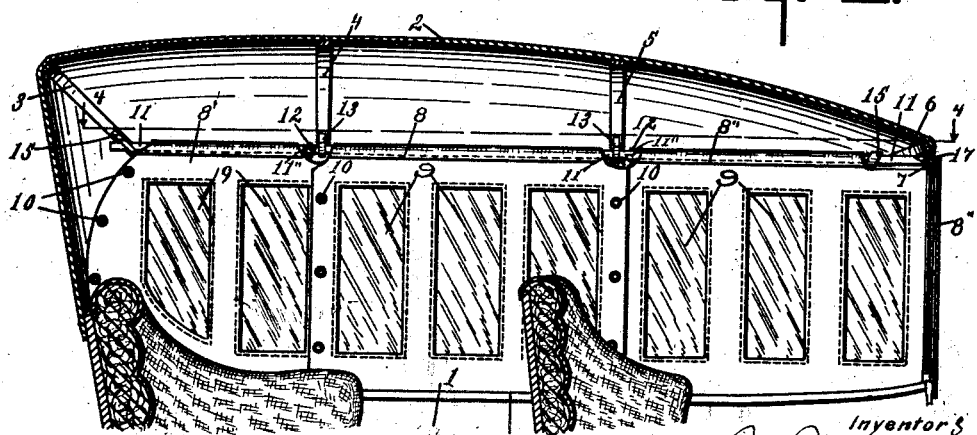
Fig. III.

H. J. TIFFANY & G. A. YOUNG.
AUTOMOBILE CURTAIN.
APPLICATION FILED MAR. 30, 1914.
1,140,858.
Patented May 25, 1915.
2 SHEETS—SHEET 2.
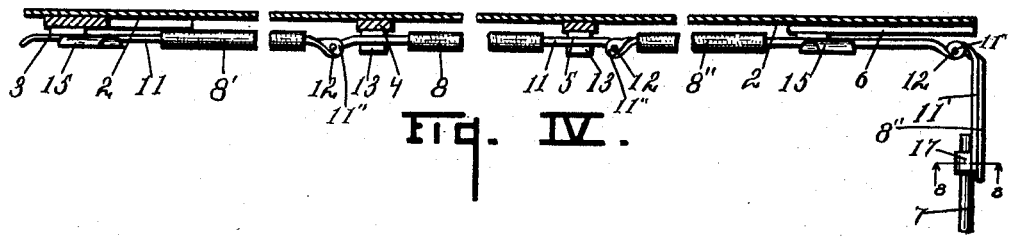
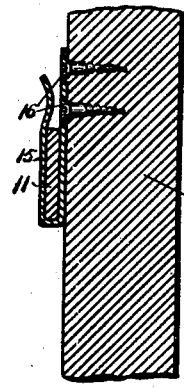
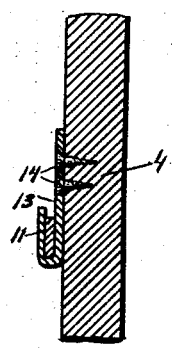
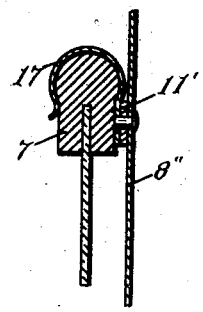
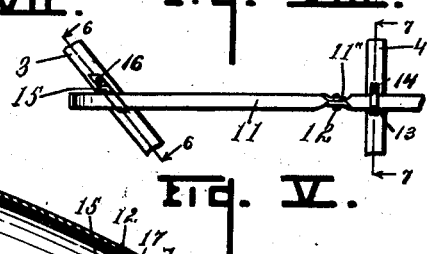
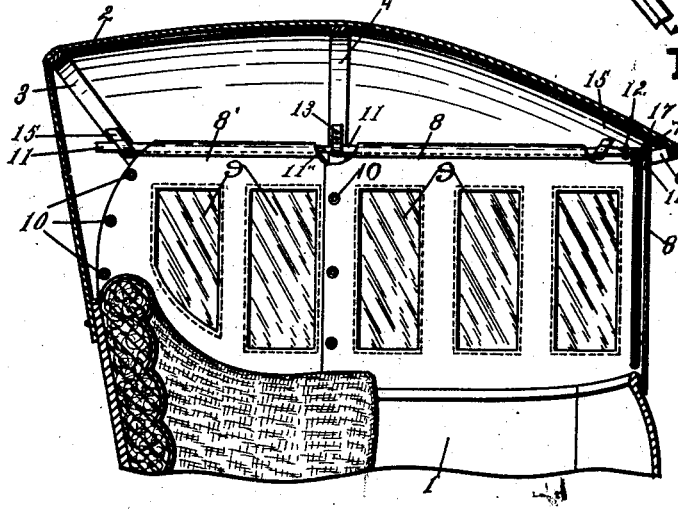
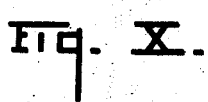

UNITED STATES PATENT OFFICE.

HARRY J. TIFFANY AND GEORGE A. YOUNG, OF JACKSON, MICHIGAN.

AUTOMOBILE-CURTAIN.

1,140,858.  Specification of Letters Patent.  Patented May 25, 1915.

Application filed March 30, 1914. Serial No. 828,188.

*To all whom it may concern:*

Be it known that we, HARRY J. TIFFANY and GEORGE A. YOUNG, citizens of the United States, residing at Jackson, in the county of Jackson and State of Michigan, have invented certain new and useful Improvements in Automobile-Curtains, of which the following is a specification.

This invention relates to improvements in automobile curtains.

The objects of this invention are: First, to provide an improved automobile curtain made up of sections and so disposed and supported as to permit of its being readily and quickly fastened in place from the inside of the automobile. Second, to provide a sectional automobile curtain which can be carried out of sight in the top when not in use. Third, to provide an improved sectional automobile curtain which can be quickly and readily detached from the top or secured thereto.

Further objects, and objects relating to details and economies of construction and operation will definitely appear from the detailed description to follow.

We accomplish the objects of our invention by the devices and means described in the following specification.

The invention is clearly defined and pointed out in the claims.

A structure constituting a preferred embodiment of our invention is clearly shown in the accompanying drawings forming a part of this specification, in which:

Figure I is a view partly in section of an automobile top equipped with a curtain embodying our invention. Fig. II is a view similar to Fig. I, showing one section of the curtain lowered in operative position. Fig. III is a view similar to Figs. I and II, showing the entire curtain lowered into position. Fig. IV is a detail sectional view on the line 4—4 of Fig. III, showing the manner in which the curtain supporting bars are carried by the top supporting bows. Fig. V is a detail elevation showing the manner in which the curtain supporting bars are carried by the top bows. Fig. VI is a detail sectional view on the line 6—6 of Fig. V, showing one of the clips carrying the curtain supporting bar. Fig. VII is a detail sectional view on the line 7—7 of Fig. V, showing another clip carrying the curtain supporting bar. Fig. VIII is a sectional view on the line 8—8 of Fig. IV, showing the manner in which the curtain is fastened to the wind shield. Fig. IX is a view in section through an automobile top, showing a two section curtain constructed according to our invention. Fig. X is a detail section view of a modified form of construction in which a clip is provided on the curtain supporting bar engaging one of the top supporting bows.

In the drawings, similar reference numerals refer to similar parts and the sectional views are taken looking in the direction of the little arrows at the ends of the section lines.

Considering the numbered parts of the drawing, 1 is an automobile body provided with a top 2 which is carried by the supporting bows 3, 4, 5 and 6.

7 is the wind shield carried by the front of the automobile body. The curtain, in the preferred structure, is made in three sections 8, 8' and 8", and provided with the windows 9 of glass or other transparent material. The edges of the curtains are provided with eyelets or buttonholes 10, by which the curtains are fastened to the top as in the usual curtain construction.

The upper edges of the curtain sections are provided with pockets in which are disposed the flat curtain supporting bars 11. The bars 11 extend along the side of the top and are provided at the ends adjacent to each other with portions 11" which are twisted until they lie in a plane at right angles to the body of the bar. The bars are hinged together by means of bolts 12 passing through said twisted portions 11'. The bows 4 and 5 have metal clips 13 secured thereto by means of the screws 14 and said bars 11 are detachably carried by means of said clips 13. The bows 3 and 6 which extend at an angle to the vertical are provided with the clips 15 of spring metal secured thereto by the screws 16, and the ends of bars 11 are supported in said spring clips. A bar 11' is hinged to the forward bar 11 and on its forward end the bar 11' carries a curved U-shaped clip 17 which is adapted to engage over the top of the wind shield 7. The curtain 8" is supported in part by said bar 11'.

It will be apparent that the bars 11 might be supported by clips carried thereby and engaging the top supporting bows running at an angle to the vertical and such an arrangement we consider within the spirit of our invention. In Fig. X we have shown such an arrangement in which the bar 11 has secured thereto the U-shaped clip 20 which is adapted to engage the bow 6.

A strap 18 is secured to the top of the curtain section 8 at the outer edges thereof and is adapted to be passed under and around the curtain when it is rolled up and fastened to a suitable button carried by the inside lower edge of the top. Straps 19 are secured to the upper edge of the curtain 8 on the outer side thereof and are passed under and around the curtain when it is rolled up and are fastened to suitable buttons 19' carried by the bows 4 and 5 respectively below the rolled up curtain.

In Fig. IX we have shown a modification in which the curtain is provided with but two sections. This is adapted for use in a runabout or single seated automobile while the three section curtain is adapted for use in a touring car.

From the description of the parts given above the operation of this structure should be very readily understood. In Fig. III we have shown the curtain lowered in position for use. When it is desired to roll the curtain up the bar 11 carrying section 8'' is detached from the clip 15, the clip 17 is detached from the wind shield, and section 8'' is folded over on the section 8. The section 8' is detached from the clip 15 at the rear end and folded over on the section 8'', and the whole is rolled up, as shown in Fig. I, and fastened by means of the straps 18 and 19. It is thus supported out of sight in the top and can be very quickly and readily lowered from the inside. If it is desired to lower the top the curtain can be very quickly and easily removed from the top by simply lifting the bar 11 from the clips 13. The curtain can be supported with the entire three sections lowered or the back section may be left lowered and the front sections rolled up, or the front and back sections may be left lowered and the middle section rolled up according as it is desired. It will thus be seen that my improved automobile curtain affords a structure which can be quickly and easily detached from and attached to the top and which can be quickly and readily lowered from the inside of the automobile.

We are aware that the particular embodiment of our invention which we have here set forth is susceptible of considerable variation without departing from the spirit of our invention, and, therefore, we do not wish to be restricted to the same. However, we have found this form to be preferred and, therefore, we desire to claim the same specifically as well as broadly, as indicated by the appended claims.

Having thus described our invention, what we claim as new and desire to secure by Letters Patent, is:

1. In a structure of the class described, the combination with a vehicle top and the supporting bows therefor, of curtain supporting bars having adjacent ends twisted to lie in a horizontal plane, said ends being pivotally connected together, spring clips carried by the top supporting bows, said bars being detachably carried by said clips, a curtain section carried by each of said curtain supporting bars, and straps carried by the top of the central curtain section, and adapted to be passed under and around the rolled up curtain and fastened to support said curtain in rolled up position, substantially as specified.

2. In a structure of the class described, the combination with a vehicle top and the supporting bows therefor, of curtain supporting bars having adjacent ends twisted to lie in a horizontal plane, said ends being pivotally connected together, spring clips detachably supporting said bars, and a curtain section carried by each of said curtain supporting bars, substantially as specified.

3. In a structure of the class described, the combination with a vehicle top and the supporting bows therefor, of curtain supporting bars pivotally connected together, a curtain section carried by each of said curtain supporting bars, bar supporting means carried by the top supporting bows, and means for supporting said curtain sections in rolled up position.

4. In a structure of the class described, the combination with a vehicle top and the supporting bows therefor, of a plurality of curtain supporting bars pivotally connected together, spring clips carried by said bows and supporting said bars, a curtain section carried by each of said bars, the forward bar being provided with a U-shaped clip adapted to engage a wind shield, substantially as specified.

5. In a structure of the class described, the combination with a vehicle top and supporting bows therefor, of spring metal clips carried by said supporting bows, a plurality of curtain supporting bars detachably carried by said clips, said bars being pivotally connected together, curtain sections carried by each of said bars, straps carried by the top of one of said sections and adapted to pass under and around the curtain when it is rolled up, and fastening means for said straps carried by said supporting bows, all coacting substantially as described for the purpose specified.

6. In a structure of the class described, the combination with a vehicle top, of the supporting bows therefor, and a plurality of curtain supporting bars pivotally connected together, bar supporting clips carried by said bows and adapted to receive said curtain supporting bars, a curtain section carried by each of said curtain supporting bars whereby each of said curtain sections may be rolled up independently of the others, and means for supporting said curtain sections in rolled up position, all coacting substantially as described and for the purpose specified.

In witness whereof, we have hereunto set our hands and seals in the presence of two witnesses.

HARRY J. TIFFANY.
GEORGE A. YOUNG.

Witnesses:
SAMUEL J. BEAN,
FRED H. STRASSBURGER.